US007469822B2

(12) United States Patent
Razzaboni et al.

(10) Patent No.: US 7,469,822 B2
(45) Date of Patent: Dec. 30, 2008

(54) DRUM MACHINE FOR THE STORAGE OF BANKNOTES

(75) Inventors: Vittorio Razzaboni, Mirandola MO (IT); Nicoletta Razzaboni, Mirandola MO (IT)

(73) Assignee: CiMA S.p.A.di Razzaboni & C (IT)

( * ) Notice: Subject to any disclaimer, the term of this patent is extended or adjusted under 35 U.S.C. 154(b) by 335 days.

(21) Appl. No.: 10/547,925

(22) PCT Filed: Mar. 8, 2004

(86) PCT No.: PCT/EP2004/002344

§ 371 (c)(1), (2), (4) Date: Sep. 8, 2005

(87) PCT Pub. No.: WO2004/081883

PCT Pub. Date: Sep. 23, 2004

(65) Prior Publication Data

US 2006/0196753 A1 Sep. 7, 2006

(30) Foreign Application Priority Data

Mar. 11, 2003 (IT) .......................... MI2003A0456

(51) Int. Cl.
*G06Q 40/00* (2006.01)

(52) U.S. Cl. ...................................... 235/379; 271/202

(58) Field of Classification Search ................ 235/379; 271/202; 194/206
See application file for complete search history.

(56) References Cited

U.S. PATENT DOCUMENTS 3,658,322 A * 4/1972 Martin ....................... 271/184
4,509,703 A * 4/1985 Grunder ..................... 242/528
4,532,750 A * 8/1985 Meier .......................... 53/118
5,836,577 A * 11/1998 Arikawa et al. .......... 270/58.04

* cited by examiner

*Primary Examiner*—Michael G. Lee
*Assistant Examiner*—Rafferty Kelly
(74) *Attorney, Agent, or Firm*—Shlesinger & Fitzsimmons

(57) ABSTRACT

A machine for the storage of banknotes comprises means (11, 22) for conveying banknotes in sequence from an input (13) of the machine to an internal compartment (14) that comprises in turn a winding drum (15) of a couple of support tapes (16, 17) with the interposed banknotes conveyed to the compartment. Overlapping means (23) are present between the input (13) of the machine and the winding drum (15) that receive the banknotes in nonoverlapped sequence from the input (13) and send them partially overlapped towards the drum (15). Further spacing means (23) are provided for respacing the banknotes at the output from the compartment. The overlapping means and the spacing means can be made with the same device (23) suitably actuated.

12 Claims, 1 Drawing Sheet

DRUM MACHINE FOR THE STORAGE OF BANKNOTES

The present invention refers to a machine for the storage of banknotes.

Machines for the storage of banknotes are known that comprise means for conveying banknotes in sequence from an input of the machine to an internal compartment that comprises in turn a drum on which a couple of tapes is wound with the interposed banknotes conveyed to the compartment.

The general aim of the present invention is to supply a machine of this type that has improved performances however, in particular in regard to the speed of acceptance and delivery of the banknotes.

In view of this aim we considered making, according to the invention, a machine for the storage of banknotes comprising means for conveying banknotes in sequence from an input of the machine to an internal compartment that comprises a winding drum of a couple of support tapes with the banknotes conveyed to the compartment interposed, characterized in that between the input of the machine and the winding drum overlapping means are positioned that receive the banknotes in non-overlapped sequence from the input and send them partially overlapped towards the drum.

To make even clearer the explanation of the innovative principles of the present invention and its advantages in comparison with the known technique, herein below follows the description of an embodiment thereof applying said principles with the aid of enclosed drawings. In the drawings.

Figure 1:
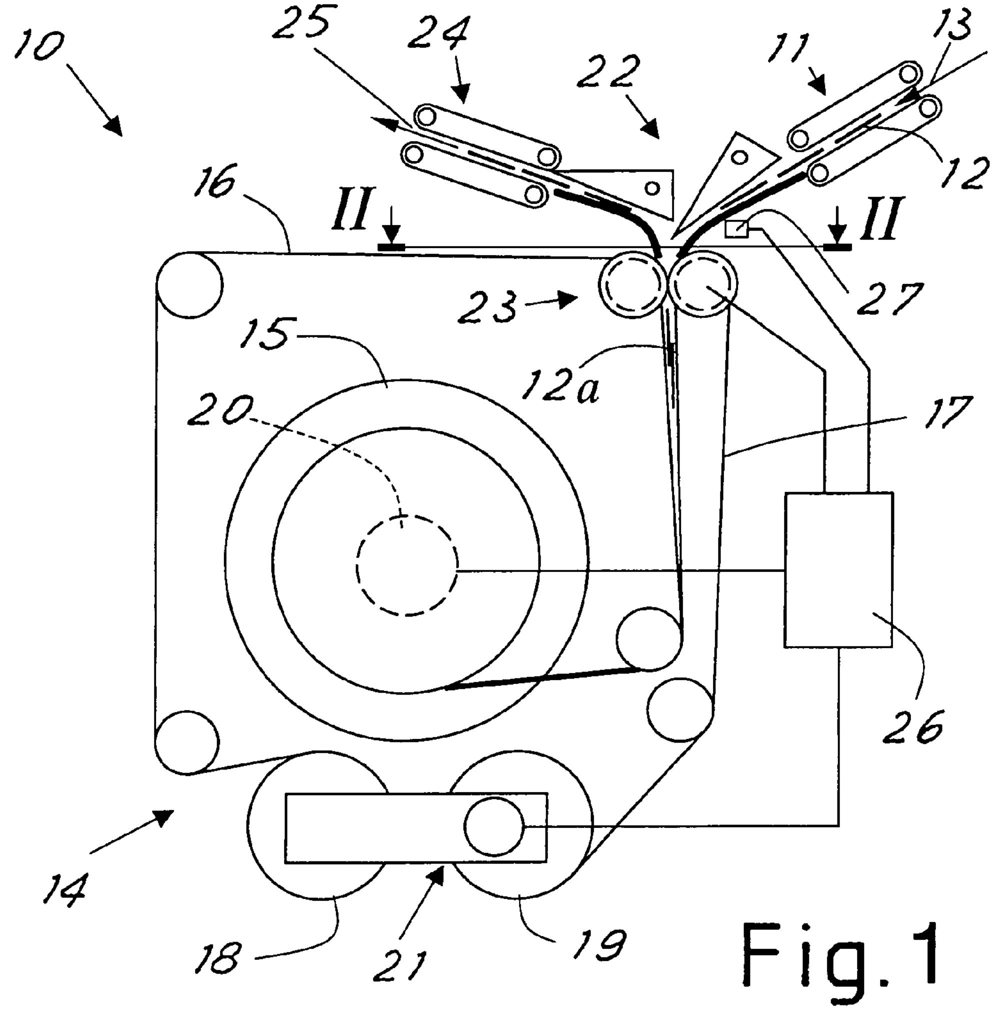
FIG. 1 represents a schematic view of a machine according to the invention.

With reference to the figures, FIG. 1 shows a machine for the storage of banknotes, indicated in general terms with 10. This machine comprises means 11 for conveying banknotes in sequence 12 from an input 13 of the machine to an internal compartment 14. The means for conveying can comprise one or more conveyor belts and other known means such as wheels and rails, not shown here in detail as a technician can easily imagine them. Deflector means 22 can also be provided, for sorting along different paths of the banknotes in input to and output from the compartment.

The compartment comprises a motorized drum 15 for winding a couple of support tapes 16, 17 that unwind from feeding reels 18, 19. The tapes are lead to wind onto the drum with the banknotes conveyed to the compartment interposed.

During the movement of receiving the banknotes the drum is moved by a motor 20 while the tape reels are idle. During the opposite movement of returning the banknotes the drum 15 is left idle and is made rotate by the rewinding of the tapes on the reels, motorized in a synchronized manner by means of a motorization 21.

Overlapping means 23 are positioned between the input 13 of the machine and the winding drum 15 which receive the banknotes in non-overlapped sequence from the input 13 and send them partially overlapped (as shown schematically in 12*a*) towards the drum 15. For the return in output, the machine can comprise means 24 for conveying banknotes in sequence from the drum to an output 25. The means 24 are known means similar to the conveying means 11.

Spacing means are positioned between drum 15 and output 25 that receive the partially overlapped banknotes from the drum and send them in non-overlapped sequence to the output. Advantageously, the spacing means and the overlapping means are made with the same path device in opposite directions, as will be clarified below.

For reasons of operative efficiency, it has been found advantageous for the path between the input and the overlapping means to be separate from the path between the spacing means and the output. In this manner, there is the possibility of independent operation of known accessories of selection, sorting, checking, etc., possibly positioned along the input and output paths.

The overlapping and spacing means suitably accelerate the banknotes in transit to increase the speed in relation to the speed of the tapes 16, 17, so that during storage a banknote in transit can reach the banknote that passed previously pulled by the speed of the tape, while during unrolling the banknote in transit in the means is moved away from the following banknote still being drawn by the tapes. The output means 24 then keep the distance reached.

For the control of the speeds and the rotation direction of the various motorizations a control system 26 is provided, for example an electronic controller suitably programmed. This control system is of a known structure and can be easily imagined by the technician and will not be further described or shown here. Advantageously, a sensor 27 (for example, of the optical type) can be provided, that detects the passage of banknotes directed towards the overlapping means for controlling the action of the overlapping means and ensuring the right degree of overlapping, actuating overlapping means with the correct timing in relation to the transit of the banknotes.

In the preferred embodiment, the banknotes are conveyed with the greater dimension transversal to the movement direction.

A position found advantageous for the spacing and overlapping means is at the input of the compartment, that is, in the zone where the belts come side-by-side to make a narrow passage for the banknotes and then reach the drum.

Figure 2:
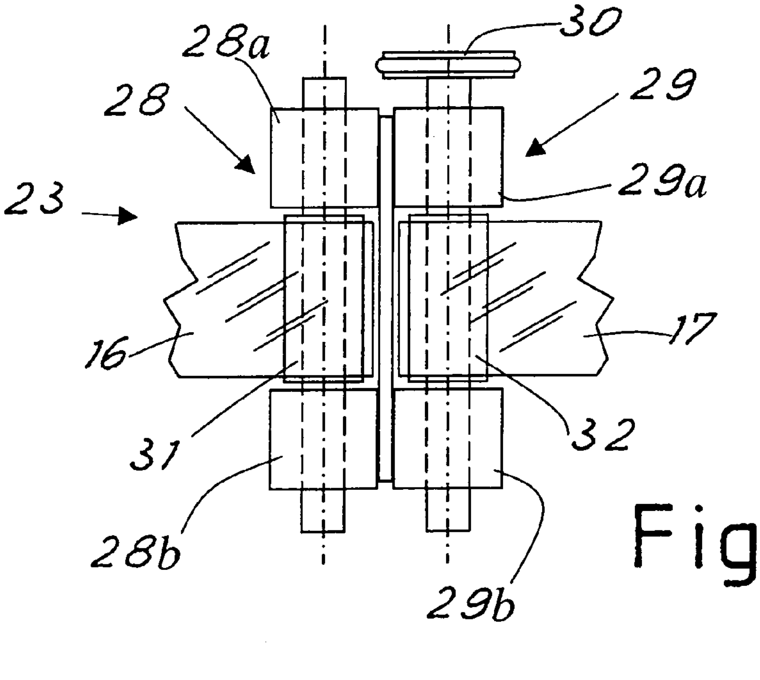
FIG. 2 represents a view, taken along the line II-II of FIG. 1, of a detail of the machine.

Preferred overlapping and spacing means are shown more in detail in FIG. 2.

As can be seen in this Figure, the spacing means and the overlapping means comprise a couple of traction rollers 28, 29 positioned facing each other and parallel, between which the banknotes 12 pass. The distance between the rollers is such as to ensure the traction of the banknotes. For example, the rollers, covered in rubber or similar, can be in contact along the periphery. The couple of traction rollers is motorized to vary upon command the speed of the banknotes that flow between them in the sense of bringing closer or taking further away the successive banknotes. The motorization can be achieved by connecting one of the rollers of the couple to a motor (not shown) through a transmission 30, while the other roller is put into rotation by contact with the first one.

In the preferred embodiment, the couple of the rollers 28, 29 is coaxial to rollers 31, 32 for returning the tapes 16, 17 between a condition of bringing closer the surfaces of the tapes towards the drum and a condition of taking them further away in relation to the respective reels 18, 19 for feeding and collecting the tapes. In particular, each roller of the couple of traction rollers is divided into two roller segments 28*a*, 28*b* and 29*a*, 29*b* that are positioned at the two ends of a corresponding roller 31, 32 of said return rollers. The return roller has a smaller diameter than the diameter of the two traction roller segments between which it is inserted so as not to interfere with the banknotes. The tapes have a lower width than the dimension of the banknotes that is transversal to the flow direction. The return rollers are mounted idle on the same shaft as the corresponding traction roller.

At this point it is clear how the preset aims are achieved. In particular, the speed of dispensing and storage of the banknotes is increased, without having to excessively increase the flow speeds of the tapes of the compartment. In addition, the length of the tapes can be kept considerably more reduced than the tapes of the known technique at an equal number of banknotes that can be stored. The entity of overlapping can be varied a lot by suitably commanding the overlapping device.

Naturally, the description made above of an embodiment applying the innovative principles of the present invention is given as an example of these innovative principles and therefore must not be taken as limiting within the sphere of patent right herein claimed. The machine can, for example, comprise known means for the recognition, selection and checking of the banknotes. The machine can also be fitted with several drum compartments, with suitable means for selecting the path of the banknotes.

The invention claimed is:

1. Machine for the storage of banknotes comprising means for conveying banknotes in non-overlapped sequence along a movement direction from an input of the machine to an internal compartment that comprises a winding drum of a couple of support tapes with the banknotes conveyed to the compartment being interposed between the tapes, between the input of the machine and the winding drum overlapping means being present which receive the banknotes in non-overlapped sequence along said movement direction from the input, accelerate the speed of the banknotes to increase their speed in relation to the speed of the tapes winding on the drum, and send the banknotes partially overlapped along said movement direction towards the drum; and wherein speeding up of the banknotes is performed by a couple of parallel traction rollers between which the banknotes pass, the couple of traction rollers being motorized to vary upon command the speed of the banknotes that flow between them in the sense that the successive banknotes are brought closer.

2. Machine according to claim 1, characterized in that it comprises means for conveying banknotes in sequence from drum to an output of the machine, between drum and output spacing means being positioned to receive the partially overlapped banknotes from the drum and send them in non-overlapped sequence to the output.

3. Machine according to claim 2, characterized in that the spacing means accelerate the banknotes to increase their speed in relation to the speed of the tapes being unwound from the drum.

4. Machine according to claim 2, characterized in that the path between the input and the overlapping means is basically separate from the path between the spacing means and the output.

5. Machine according to claim 2, characterized in that the spacing means and the overlapping means comprise a couple of parallel traction rollers between which the banknotes pass, the couple of traction rollers being motorized to vary upon command the speed of the banknotes that flow between them in the sense that the successive banknotes are brought closer or further away.

6. Machine according to claim 5, characterized in that a roller of the couple is motorized and the other is rotated through contact with the first.

7. Machine according to claim 2, characterized in that the overlapping means and the spacing means are formed by the same device followed in the opposite direction by the banknotes in input or output.

8. Machine according to claim 5, characterized in that the overlapping means and the spacing means are formed by the same device followed in the opposite direction by the banknotes in input or output and the couple of rollers is coaxial to the return rollers of the tapes between a condition of bringing the surfaces closer towards the drum and a further away condition in relation to the respective feeding and collection reels of the two tapes.

9. Machine according to claim 8, characterized in that each roller of the couple of traction rollers is divided into two roller segments positioned at the two ends of a corresponding roller of the said return rollers, the return roller having a smaller diameter than the diameter of the two segments of traction roller between which it is inserted so as not to interfere with the banknotes in transit.

10. Machine according to claim 9, characterized in that the return rollers are mounted idle on the same shaft as the corresponding traction roller.

11. Machine according to claim 1, characterized in that it comprises a sensor for detecting the passage of banknotes directed towards the overlapping means to control the action of the overlapping means.

12. Machine according to claim 1, characterized in that the banknotes are moved with the greater dimension transversal to the conveying movement.

* * * * *